United States Patent
Liu et al.

(10) Patent No.: US 7,121,701 B2
(45) Date of Patent: Oct. 17, 2006

(54) EXTRA REAR-VIEW MIRROR FOR A VEHICLE

(75) Inventors: An Sheng Liu, P.O. Box 63-150, Taichung City (TW) 406; Zheng Zong Xiao, Taichung (TW)

(73) Assignee: An Sheng Liu, Taichung City (TW)

( * ) Notice: Subject to any disclaimer, the term of this patent is extended or adjusted under 35 U.S.C. 154(b) by 78 days.

(21) Appl. No.: 10/988,357

(22) Filed: Nov. 15, 2004

(65) Prior Publication Data
US 2006/0087857 A1    Apr. 27, 2006

(51) Int. Cl.
*B60Q 1/26* (2006.01)
(52) U.S. Cl. .................. 362/504; 362/142; 362/494
(58) Field of Classification Search ............. 362/494, 362/498, 499, 503, 504, 544, 545, 512, 513, 362/139, 142, 143; 359/841, 872
See application file for complete search history.

(56) References Cited

U.S. PATENT DOCUMENTS

| | | | | |
|---|---|---|---|---|
| 2,511,971 A | * | 6/1950 | Dalton | 362/494 |
| 3,146,296 A | * | 8/1964 | Fischer | 359/864 |
| 4,925,287 A | * | 5/1990 | Lord et al. | 359/872 |
| 5,313,337 A | * | 5/1994 | Byers | 359/872 |
| 6,199,993 B1 | * | 3/2001 | Mou | 359/864 |

* cited by examiner

*Primary Examiner*—Renee Luebke
*Assistant Examiner*—Gunyoung T. Lee

(57) ABSTRACT

An extra rear-view mirror for a vehicle includes a frame mounted upon a rear windshield of the vehicle. The frame includes a bottom having a half-spherical reflector mounted thereon for reflecting image to a middle rear-view mirror in the vehicle and a thickened side formed opposite to the vehicle. At least one chamber is defined in the thickened side of the frame and at least one opening is defined in the thickened side of the frame and longitudinally communicating with the at least one chamber. At least one light projector is disposed in the at least one chamber and electrically connected to a reversing system of the vehicle for promoting the bright effect when the vehicle is reversed.

6 Claims, 7 Drawing Sheets

EXTRA REAR-VIEW MIRROR FOR A VEHICLE

BACKGROUND OF THE INVENTION

1. Field of the Invention

The present invention relates to a mirror, and more particularly to an extra rear-view mirror for a vehicle.

2. Description of Related Art

A driver usually views the back image via three conventional rear-view mirrors (a middle rear-view mirror, a left rear-view mirror and a right rear-view mirror) when backing a car. The reversing light is designed for warning other cars and the people who are situated at the back of the car. Consequently, the brightness provided by the reversing light is not enough (effective distance about 30–50 cm) for the driver to clearly view the back image when backing the car in dark, especially to a station wagon, a truck or a recreation vehicle. As a result, the station wagon, a truck or a recreation vehicle usually has an extra rear-view mirror (1) mounted in the rear thereof and facing the ground, as shown in FIG. 11. The conventional extra rear-view mirror (1) includes a spherical reflector (2) attached thereto for reflecting the rear image to the middle rear-view mirror (3). As described above, the bright distance (S) of the reversing light (4) is about 30–50 cm. Consequently, the conventional extra rear-view mirror (1) provides little help to the middle rear-view mirror (3), and the left and right rear-view mirror (5). It is very dangerous when the car is reversed front of a gutter or a overhanging cliff.

The present invention has arisen to mitigate and/or obviate the disadvantages of the conventional extra rear-view mirror.

SUMMARY OF THE INVENTION

The main objective of the present invention is to provide an improved extra rear-view mirror for promoting the safety when the vehicle is reversed.

To achieve the objective, the extra rear-view mirror in accordance with the present invention comprises a frame mounted upon a rear windshield of the vehicle. The frame includes a bottom having a half-spherical reflector mounted thereon for reflecting image to a middle rear-view mirror in the vehicle and a thickened side formed opposite to the vehicle. At least one chamber is defined in the thickened side of the frame and at least one opening is defined in the thickened side of the frame and longitudinally communicating with the at least one chamber. At least one light projector is disposed in the at least one chamber and electrically connected to a reversing system of the vehicle for promoting the bright effect when the vehicle is reversed.

Further benefits and advantages of the present invention will become apparent after a careful reading of the detailed description with appropriate reference to the accompanying drawings.

DETAILED DESCRIPTION OF THE INVENTION

Figure 2:
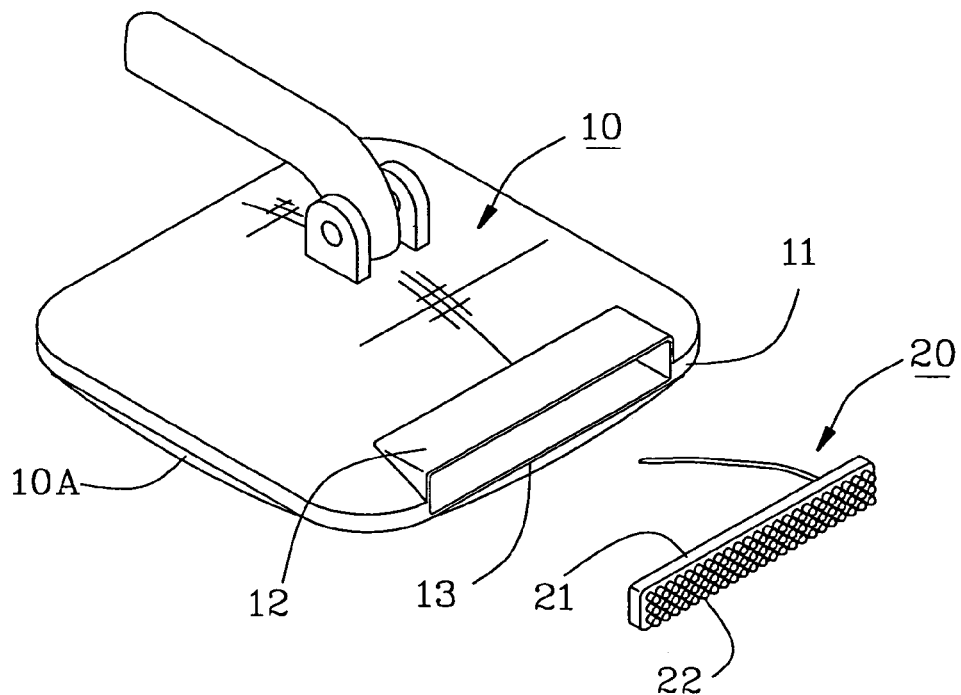
FIG. 2 is an exploded perspective view of the extra rear-view mirror in FIG. 1.
Figure 1:
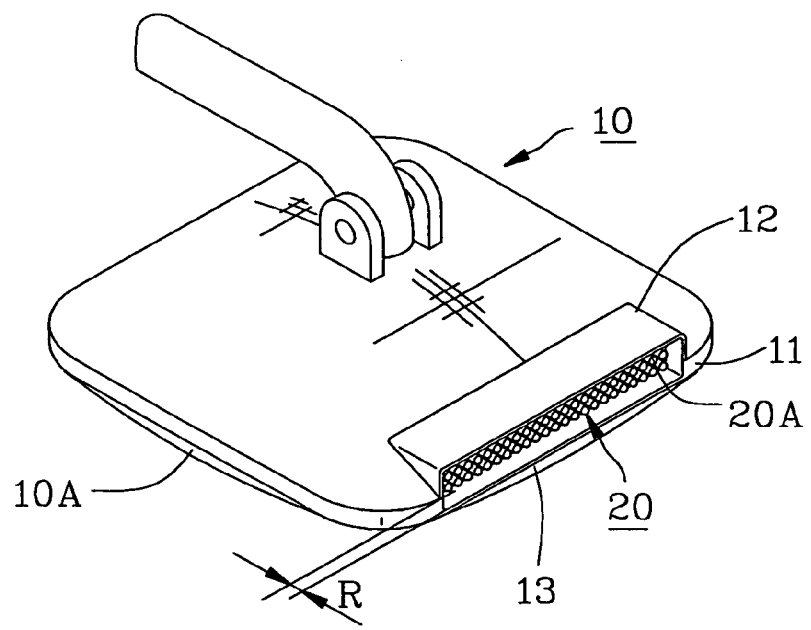
FIG. 1 is a perspective view of an extra rear-view mirror in accordance with the present invention.
Figure 9:
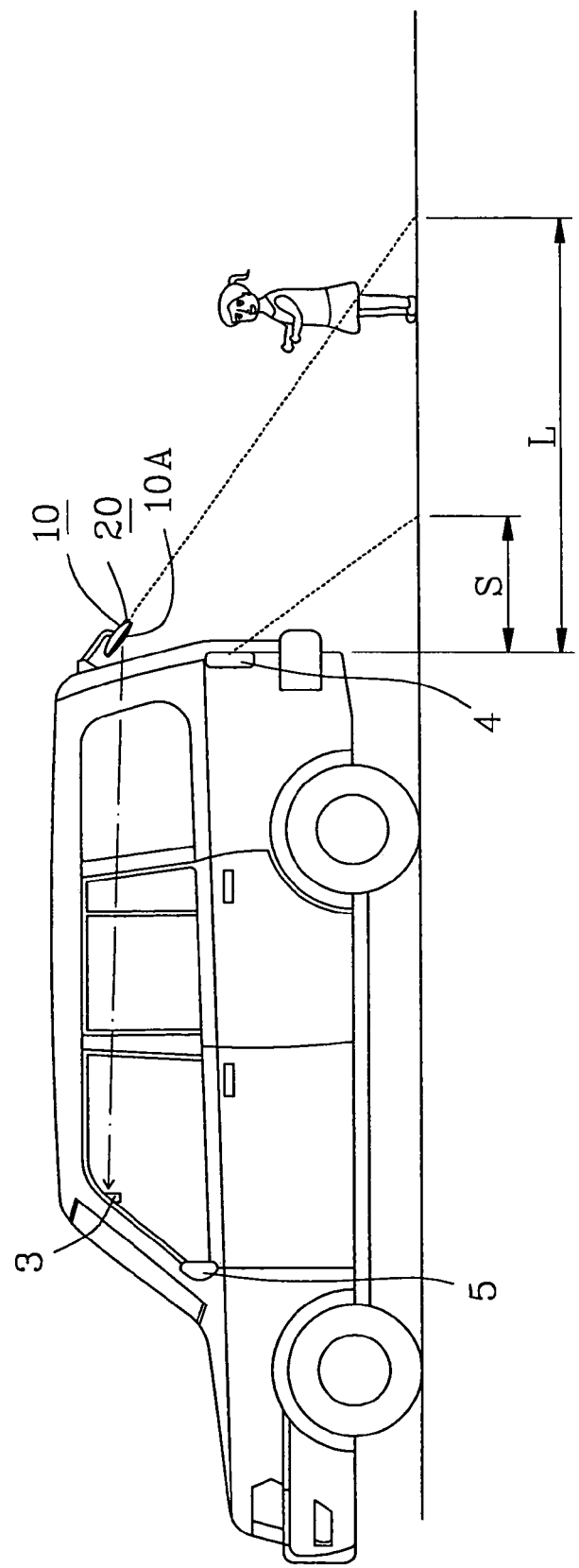
FIG. 9 is a side operational view of the extra rear-view mirror in accordance with the present invention.

Referring to the drawings and initially to FIGS. 1, 2 and 9, an extra rear-view mirror for a vehicle in accordance with the present invention comprises a frame (10) mounted upon a rear windshield of the vehicle, and a half-spherical reflector (10A) mounted on the frame (10) toward a middle rear-view mirror (3) in the vehicle. The frame (10) has a thickened side (11) formed opposite to the vehicle and a groove (12) is laterally defined in the thickened side (11). The groove (12) longitudinally corresponds to the frame (10). An opening (13) is defined in the thickened side (11) and longitudinally communicates with the groove (12).

A light projector (20) is received in the groove (12). In the preferred embodiment of the present invention, the light projector (20) is a series of LEDs (21) that are electrically mounted on a PCB and electrically connected to an electric circuit of the vehicle. A distance (R) is formed between the top of the light projector (20) and the opening (13) such that the light ray from the light projector (20) is centralized in the groove (12) to prevent the spherical reflector (10A) from a scattering due to a blaze from the light projector (20).

The light projector (20) is simultaneously lighted with the reversing light (4) of the vehicle and projects light ray to stretch the bright distance (S) of the reversing light (4) to 300–500 cm. Consequently, the driver can clearly view the image behind the vehicle from the middle rear-view mirror (3) that shows the image reflected by the half-spherical reflector (10A) of the extra rear-view mirror in accordance with the present invention.

Figure 10:
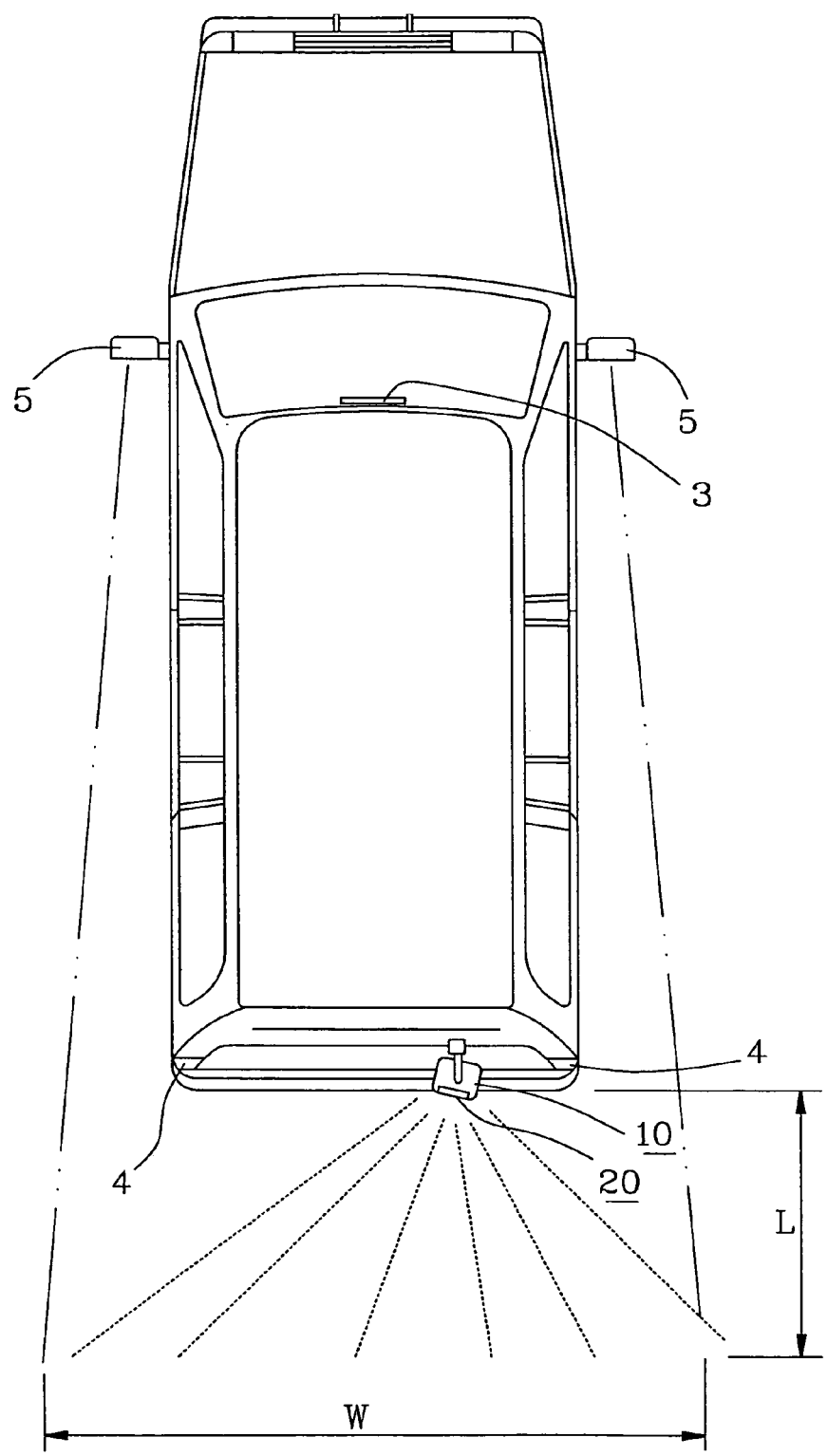
FIG. 10 is s top operational view of the extra rear-view mirror in accordance with the present invention.
Figure 11:
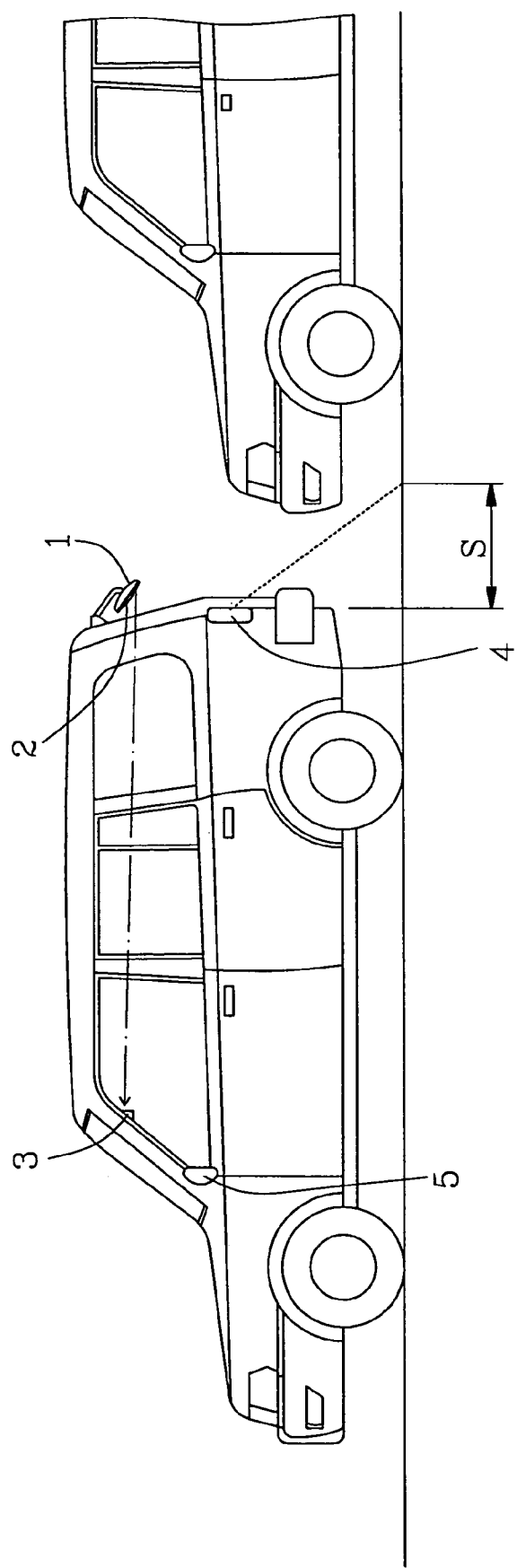
FIG. 11 is a side operational view of a conventional extra rear-view mirror in accordance with the prior art.

Further with reference to FIG. 10, the light projector (20) of the present invention further widens the bright width of the original reversing light (4) such that the vehicle has a widened bright width (W). Consequently, the driver can clearly view the condition of two sides of the vehicle via the left and right rear-view mirrors (4) such that the driver can immediately previously find the latent dangerous condition.

Figure 4:
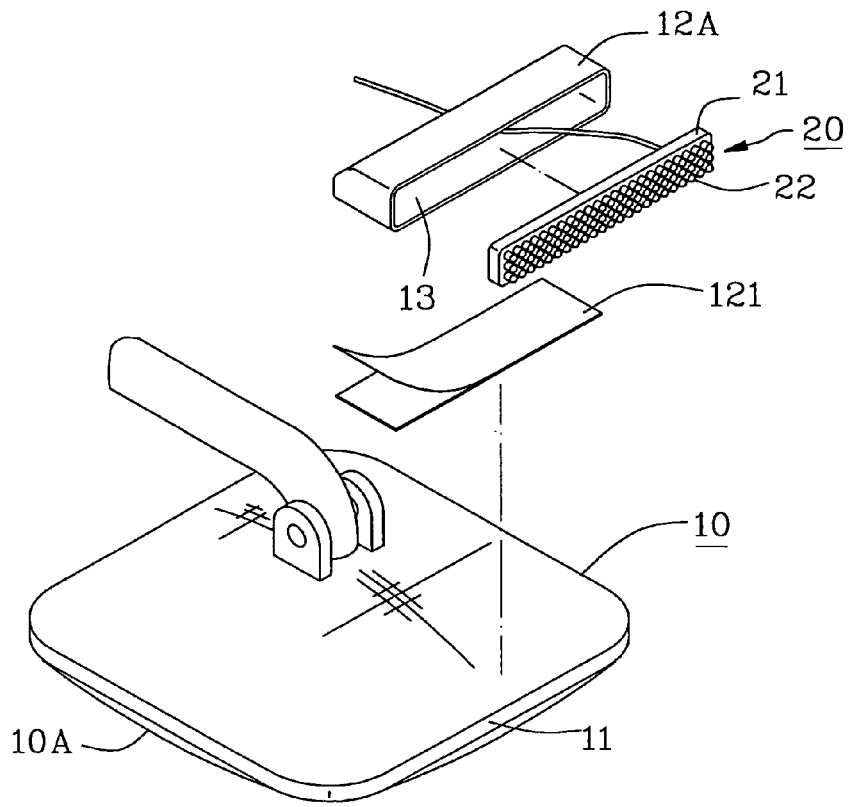
FIG. 4 is an exploded perspective view of the extra rear-view mirror in FIG. 3.
Figure 3:
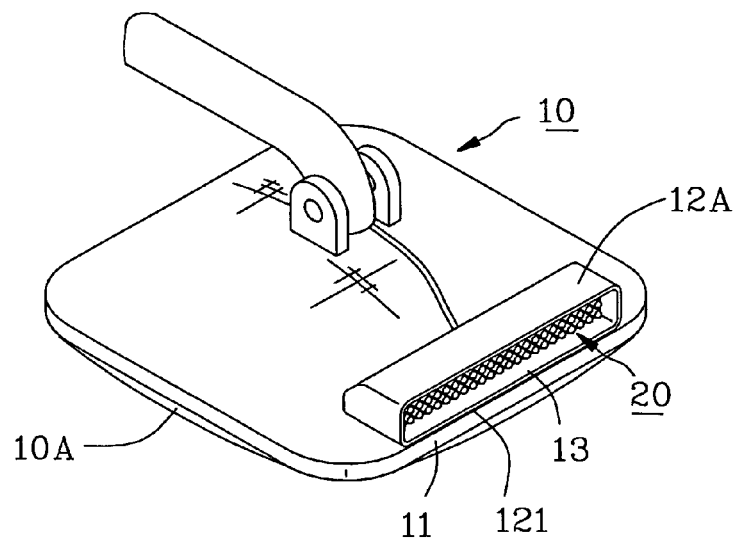
FIG. 3 is a perspective view of a second embodiment of the extra rear-view mirror in accordance with the present invention.

With reference to FIGS. 3 and 4 that show a second embodiment of die extra rear-view mirror of the present invention, the extra rear-view mirror in accordance with the present invention comprises a casing (12A) attached to on side of the frame (10) opposite to the vehicle due to a double sided adhesive tape (121) that is disposed between the casing (12A) and the frame (10). The light projector (20) is received in the casing (12A). Consequently, the present invention can be collocated with the conventional extra rear-view mirror.

Figure 6:
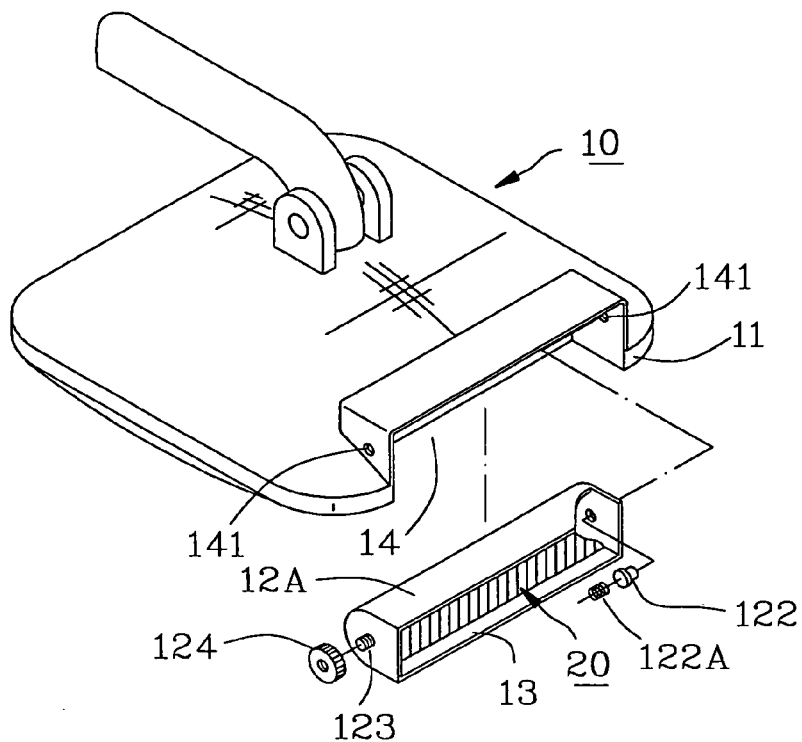
FIG. 6 is an exploded perspective view of the extra rear-view mirror in FIG. 5.
Figure 5:
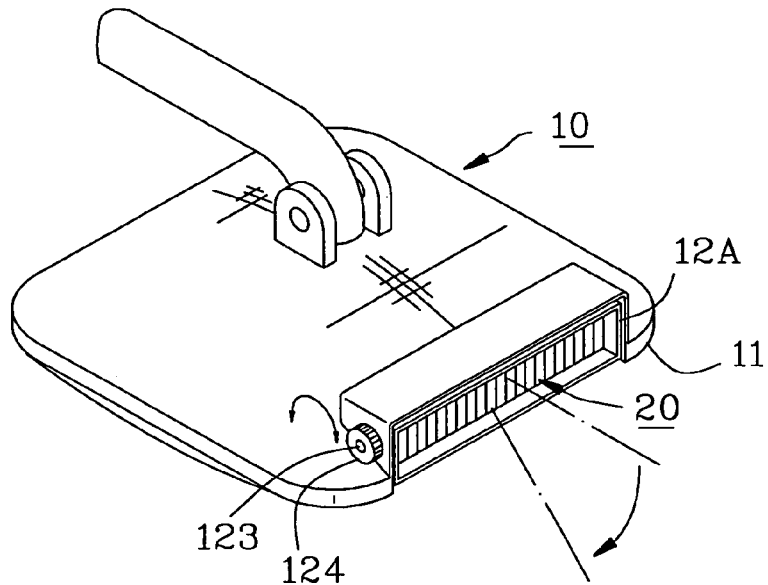
FIG. 5 is a perspective view of a third embodiment of the extra rear-view mirror in accordance with the present invention.

With reference to FIGS. 5 and 6 that show a third embodiment of the extra rear-view mirror of the present invention, the extra rear-view mirror in accordance with the present invention comprises a trough (14) defined in the thickened side of the frame (10) and the casing (12A) selectively pivotally received in the trough (14). The light projector (20), provided above, is received in die casing (12A). Two through holes (141) are defined in the thickened side and respectively communicate with two opposite ends of the trough (14). The casing (12A) includes a first end having a pivot (122) pivotally extending into a corresponding one of the two through holes and a spring (122A) disposed in the casing (12A). The spring (12A) abuts the pivot (122) to maintain the pivot (122) pivotally received in the corresponding one of the two through holes (141). The casing (12A) includes a second end having a threaded rod (123) laterally extending therefrom. The threaded rod (123) pivotally extends through a corresponding one of the two through holes (141) opposite to the pivot (122). A nut (124) is screwed onto the threaded rod (123) after the threaded rod (123) extending through the corresponding one of the two through holes (141) opposite to the pivot (122) to selectively position the casing (12A). As a result, the projecting angle and the bright distance (L), as shown FIG. 9, of the light projector (20) are adjustable.

Figure 8:
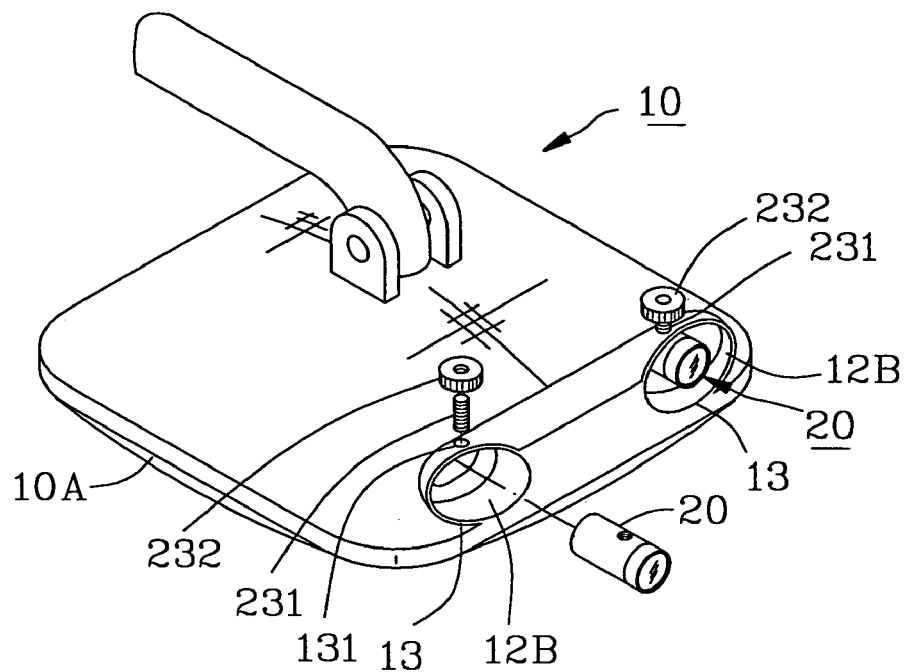
FIG. 8 is a partially exploded perspective view of the extra rear-view mirror in FIG. 7.
Figure 7:
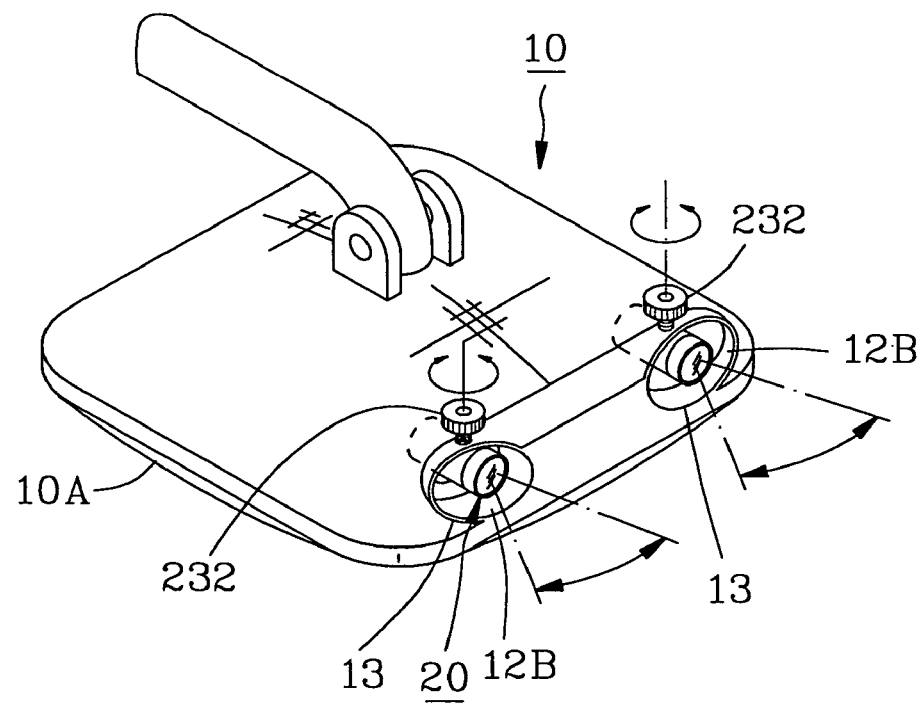
FIG. 7 is a perspective view of a fourth embodiment of the extra rear-view mirror in accordance with the present invention.

With reference to FIGS. 7 and 8 that show a fourth embodiment of the extra rear-view mirror of the present invention, the extra rear-view mirror in accordance with the present invention comprises two cavities (12B) defined in the thickened side of the frame (10). Two openings (13) are defined in the thickened side of the frame (10) and each communicates with a corresponding one of the two cavities (12B). Two though holes (131) is defined in the top of the frame (10) and each perpendicularly communicates with a corresponding one of the two cavities (128). Two light projectors (20) are respectively received in a corresponding one of the two cavities (12B). In the preferred embodiment of the present invention, the projector is a projecting bulb. A threaded rod (231) pivotally extends through a corresponding one of the two through holes (131) and is screwed into a corresponding one of the two projectors (20). A nut (232) is screwed onto the threaded rod (231) to selectively position the corresponding light projector (20). Consequently, the bright width (W) of the present invention is adjustable.

Although the invention has been explained in relation to its preferred embodiment, it is to be understood that many other possible modifications and variations can be made without departing from the spirit and scope of the invention as hereinafter claimed.

What is claimed is:

1. An extra rear-view mirror for a vehicle, comprising:
   a frame adapted to be mounted upon a rear windshield of the vehicle, the frame including a bottom having a half-spherical reflector mounted thereon for reflecting an image to a middle rear-view mirror in the vehicle and a thickened side formed opposite to the vehicle;
   at least one chamber defined in the thickened side of the frame;
   at least one opening defined in the thickened side of the frame and longitudinally communicating with the at least one chamber;
   at least one light projector disposed in the at least one chamber and adapted to be electrically connected to a reversing system of the vehicle for promoting a bright effect when the vehicle is reversed, the at least one light projector pivotally mounted in a horizontal axis in the at least one chamber such that a bright distance of the at least one light projector is adjustable.

2. The extra rear-view mirror as claimed in claim 1, wherein the at least one light projector is a series of LEDs.

3. The extra rear-view mirror as claimed in claim 1, wherein the at least one light projector is a projecting bulb.

4. An extra rear-view mirror for a vehicle, comprising:
   a frame adapted to be mounted upon a rear windshield of the vehicle, the frame including a bottom having a half-spherical reflector mounted thereon for reflecting an image to a middle rear-view mirror in the vehicle and a thickened side formed opposite to the vehicle;
   at least one chamber defined in the thickened side of the frame;
   at least one opening defined in the thickened side of the frame and longitudinally communicating with the at least one chamber;
   at least one light projector disposed in the at least one chamber and adapted to be electrically connected to a reversing system of the vehicle for promoting a bright effect when the vehicle is reversed, the at least one light projector pivotally mounted in a vertical axis in the at least one chamber such that a bright width of the at least one light projector is adjustable.

5. The extra rear-view mirror as claimed in claim 4, wherein the at least one light projector is a series of LEDs.

6. The extra rear-view mirror as claimed in claim 4, wherein the at least one light projector is a projecting bulb.

* * * * *